Aug. 10, 1937. W. S. ANDERSON Re. 20,464
LAST MEMBER FOR SHOE PRESSES
Original Filed July 12, 1935
Fig.4.
Fig.1.
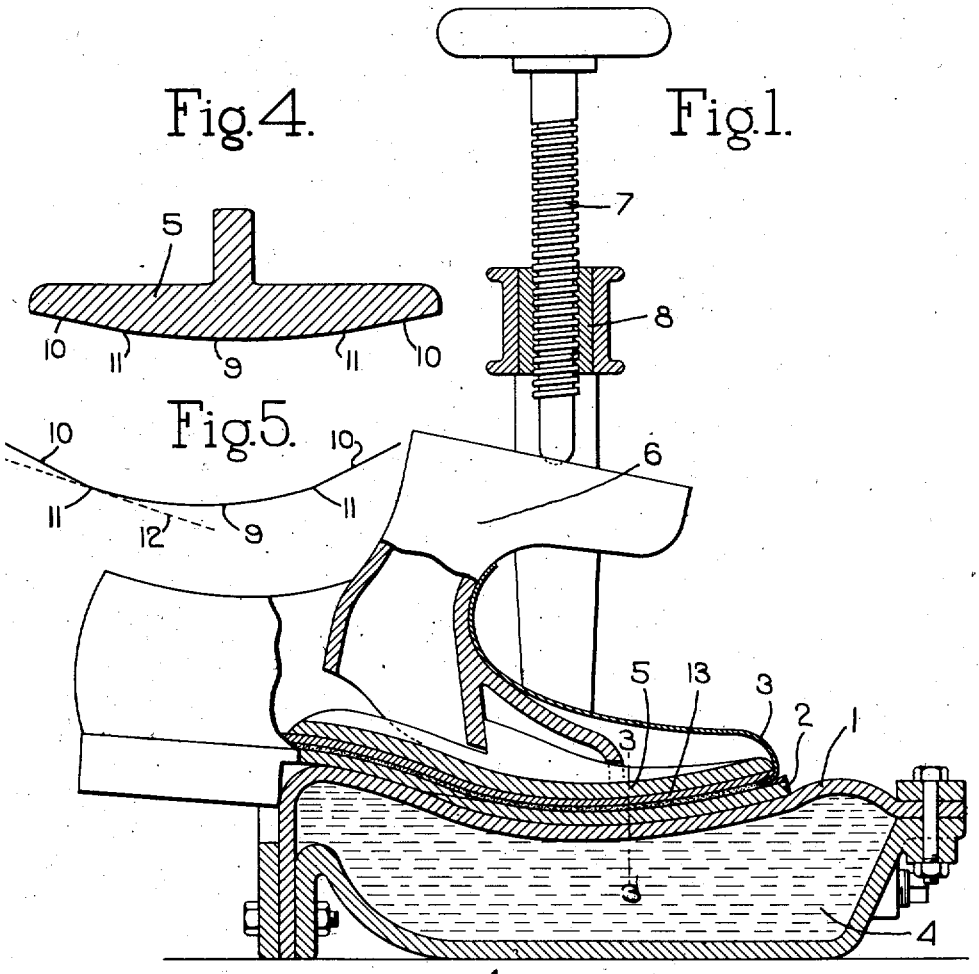
Fig.5.
Fig.2.
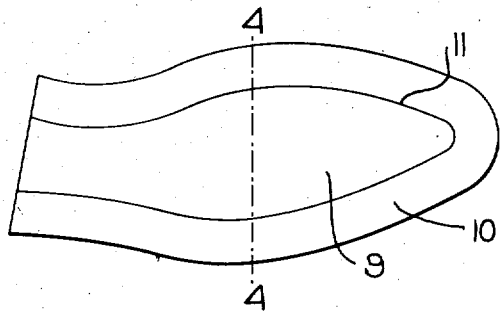
Fig.3.
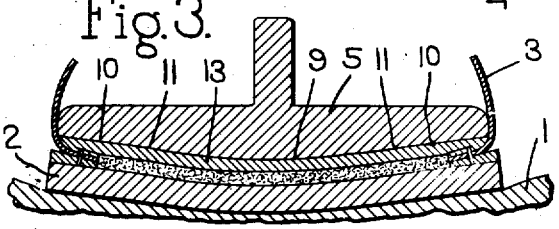
Inventor.
William S. Anderson
by Heard Smith & Tennant.
Attys.

Reissued Aug. 10, 1937

Re. 20,464

UNITED STATES PATENT OFFICE 20,464

LAST MEMBER FOR SHOE PRESSES

William S. Anderson, Philadelphia, Pa., assignor to Shoe Press Corporation, Philadelphia, Pa., a corporation of Delaware Original No. 2,069,055, dated January 26, 1937, Serial No. 31,054, July 12, 1935. Application for reissue May 29, 1937, Serial No. 145,626

4 Claims. (Cl. 12—123)

This invention relates to a last member such as is used in apparatus for attaching soles to shoe bottoms by the cement process for the purpose of applying the sole-attaching pressure to the shoe bottom.

One of the objects of the invention is to provide an improved last member which is constructed with a sole-engaging face that conforms approximately to the shape of the foot-engaging face of the sole of the average broken-in shoe rather than to the shape of the foot-engaging face of the insole of a new shoe.

After a shoe has been worn and has been thoroughly broken-in the insole takes on a shape somewhat different from that which it had when the shoe was first made, the foot-engaging face of the average broken-in shoe having a somewhat concave shape transversely of the shoe, and, in the case of a welt shoe, the welt being upwardly inclined slightly from its inner to its outer edge.

My improved last member is made with a sole-engaging face having a convex shape which conforms to the average concave shape of the foot-engaging faces of a number of broken-in shoes and with a flat face at its marginal portion which forms with the outer portion of the concave face a salient angle approximating the angle which the welt of the broken-in shoe has with the concave sole-engaging face thereof. Hence, when a last member embodying my invention is used in re-soling a used shoe by the cement process, the sole-engaging face of the last member helps to preserve, rather than to destroy, the shape which has been given to the insole by the user of the shoe, and the flat face also helps to preserve instead of disturb the position which the welt of a welt shoe has assumed after the shoe has been worn for some time. Therefore, when the re-soling operation is completed the shoe has the same comfortable natural feel that it had before the new soles were attached.

In re-soling shoes by the cement process it is customary to prepare the shoe bottom for the reception of the new sole and then to apply the cement or adhesive to the marginal portion of the shoe bottom and to the marginal portion of the sole, and then to place the sole on the shoe bottom and apply the sole-attaching pressure thereto through the medium of a suitable shoepress device, thereby to cement or weld the sole to the shoe bottom.

In order to do an effective job it is important that the sole-attaching pressure should be properly applied to the marginal portions of the sole which are provided with the cement or adhesive, and the sole plate herein illustrated having the marginal flat face which forms the salient angle with the outer portion of the concave face is admirably adapted for this purpose. This flat face not only provides for applying the proper pressure to the portion of the sole to which the cement is applied, but because of the angle which this flat face makes with the concave face the application of the sole-attaching pressure does not disturb the inclined position which the welt of a welt shoe has assumed, and furthermore any surplus cement is naturally forced outwardly to the exterior of the sole where it can be readily removed.

In order to give an understanding of the invention I have illustrated in the drawing a selected embodiment thereof which shows a last member of the type comprising a body portion and a sole plate portion, which embodiment will now be described after which the novel features will be pointed out in the appended claims.

In the drawing;

Fig. 1 is a partial sectional view through a shoepress and illustrating a last member embodying my invention of the type having a separable sole plate.

Fig. 2 is a bottom view of the sole plate showing the sole-engaging face thereof.

Fig. 3 is an enlarged section on the line 3—3, Fig. 1.

Fig. 4 is a section through the sole plate on the line 4—4, Fig. 2.

Fig. 5 is a diagrammatic view illustrating the novel features of the improved sole plate.

In Fig. 1 I have shown a solepress or shoepress of the general construction illustrated in Patents No. 1,654,408, December 27, 1927, No. 1,711,424, April 30, 1929. These solepresses comprise a flexible pad 1 to receive the sole 2 of the shoe 3 and which forms the top of a water-containing chamber 4. The shoe is pressed against the pad 1 through the medium of a last member which is inserted into the shoe and which is herein shown as of the type comprising a body portion 6 and a sole plate 5. The pressure is applied to the last member through the medium of a screw 1 screw-threaded through a yoke 8 with which shoepress is provided. The sole plate 5 is separable from the body portion 6 so that sole plates of different sizes can be used according to the size of the shoe to which the sole is being attached My improved last member is especially made so as to provide a sole-engaging face which conforms approximately to the shape of the foot-engaging face of the insole of a worn or broken-in shoe.

When a shoe is first made in accordance with standard practice the foot-engaging face of the sole is substantially flat in transverse direction, but by the time the shoe has been worn long enough to require re-soling the foot-engaging face of the insole has been given a somewhat concave shape or contour by the wearer's foot different from that which said foot-engaging face had when the shoe was first made, and the welt of a welt shoe has been turned up slightly at its edges and thus has a slightly inclined position.

A sole plate embodying my invention is made with a sole-engaging face 9 which has a convex curvature that approximates the average concave curvature or shape that is produced in any shoe after it has been worn for a considerable length of time, so that when a shoe is re-soled and the sole-attaching pressure is applied to the shoe through the sole plate embodying my invention such pressure does not disturb or change appreciably the shape of the foot-engaging face of the used shoe. Hence, when the re-soling operation is completed the foot-engaging face of the sole has substantially the same shape as it had before the sole-attaching pressure was applied thereto.

In cementing soles to shoes it is customary to apply the cement to the marginal portions of the sole and the shoe bottom, and in order properly to cement or weld the sole to the shoe bottom it is desirable that the requisite amount of pressure should be applied to the portion of the sole and shoe bottom which has been provided with the cement or other adhesive.

A sole plate embodying my invention is designed to apply this pressure properly and to do it without disturbing to any appreciable extent the position which the welt of a welt shoe has been given by continued use.

Not only is the bottom of the sole plate formed with the convex curvature above described but the marginal portion of the sole plate, which corresponds to the portions of the sole and shoe bottom to which the cement is applied, is made to present a cement track shown at 10, the surface of which is flat in directions at right angles to the edge of the sole plate and has a non-tangential relation to the convex portion 9 of the sole plate, this non-tangential relation being such as to produce an appreciable salient angle along the line 11 where the inner edge of the flat cement track 10 meets the convexly-curved central portion 9 of the bottom face of the sole plate.

This non-tangential relation between the cement track 10 and the curved bottom face 9 is best seen in Fig. 5 which is a diagrammatic view somewhat exaggerated. In said figure the curved line 9 indicates the convexly-curved bottom face of the last member and the straight portions 10 indicate the cement track. In said figure the dotted line 21 indicates a line which is tangential to the curved line 9 at the point 11 where the flat cement track 10 meets the convexly-curved face 9. It will be observed that line 10, which represents the cement track, has an angular relation to the tangential line 12, said line 10 having a position inside the tangential line which would cut across the curved line 9 if the latter were extended. This non-tangential relation of the cement track to the curved line 9 produces the salient angle or ridge 11 above referred to.

When the shoe and the sole have been assembled, after having the cement properly applied thereto and the sole-attaching pressure is applied to the sole through the last member, the cement track 10 provides a flat face through which the pressure is applied to the portion of the shoe bottom and the sole to which the cement is applied, without, however, changing to any appreciable extent the shape which this portion of the shoe bottom has assumed due to continuous wear. Moreover, because of the position of the flat face 10 relative to the convex sole-engaging face 9 by which the salient angle above referred to is formed any surplus cement which may be applied to the shoe bottom or to the sole is forced outwardly to the exterior of the sole where it can be readily removed. With this construction an exceedingly efficient adhesion can be secured between the sole and shoe bottom at the marginal portion of the shoe, and this is accomplished without changing to any appreciable extent the shape of the sole-engaging face of the shoe bottom, or, in the case of a welt shoe, the shape or position of the welt of a broken-in shoe.

With my invention, therefore, the shoe, after being resoled, has the same comfortable feeling it had before the new soles were applied.

I have above described the invention as applied to a last member adapted for use in cementing a sole to a shoe bottom in performing a re-soling operation, but the invention is equally applicable to a last adapted to be used in cementing a sole to a shoe bottom during the manufacture of a shoe. Such a last would have the bottom face formed with a slightly convex portion to approximate the complemental shape of the foot-engaging surface of the sole of the average broken-in shoe, and it would also have at the marginal portion the cement track similar to the cement track 10 above described and which is flat in a direction at right angles to the edge of the last member and has a non-tangential relation with said convex surface by which a salient angle is formed between said outer portion of the convex surface and said flat marginal portion.

When a last member having these features and embodying my invention is used in the manufacture of shoes, the foot-engaging face of the sole will be made with the concave portion similar to that which a broken-in shoe acquires, and thus the shoe when first made will have the walking ease and comfort which is normally slowly acquired by breaking in a new shoe. Furthermore, in the manufacture of welt shoes the flat cement track 10 provides a proper backing for the outer portion of the sole where the cement is applied and also serves to give the welt a slightly angular position corresponding to the position which the welt has in an average broken-in shoe, thereby further increasing the walking comfort of the shoe when new.

I claim:

1. A sole plate for use in a solepress while re-soling shoes, said sole plate having a bottom sole-engaging surface, the central portion of which is slightly convex to approximate the complemental shape of the foot-engaging surface of the sole of the average broken-in shoe, and the marginal portion of which is flat in a direction at right angles to the edge of the sole plate and has a non-tangential relation with said convex surface by which a salient angle is formed between said outer portion of the convex surface and said flat marginal portion.

2. A sole plate for use in a solepress while resoling shoes, said sole plate having a bottom sole-engaging surface, the central portion of which is slightly convex to approximate the complemental shape of the foot-engaging surface of the sole of the average broken-in shoe, and the marginal portion of which is flat in a direction at right angles to the edge of the sole plate and is situated on the inside of a line tangential to the convex central portion at the outer edge thereof, thereby to form a salient angle therewith.

3. A last member for use in a solepress while cementing a sole to a shoe bottom, said last member having a bottom sole-engaging surface, the central portion of which is slightly convex to approximate the complemental shape of the foot-engaging surface of the sole of the average broken-in shoe, and the marginal portion of which is flat in a direction at right angles to the edge of the last member and has a non-tangential relation with said convex surface by which a salient angle is formed between said outer portion of the convex surface and said flat marginal portion.

4. A last member for use in a solepress while cementing a sole to a shoe bottom, said last member having a bottom sole-engaging surface, the central portion of which is slightly convex to approximate the complemental shape of the foot-engaging surface of the sole of the average broken-in shoe, and the marginal portion of which is flat in a direction at right angles to the edge of the last member and is situated on the inside of a line tangential to the convex central portion at the outer edge thereof, thereby to form a salient angle therewith.

WILLIAM S. ANDERSON.